(12) United States Patent
    Ashley et al.

(10) Patent No.: US 10,472,292 B1
(45) Date of Patent: Nov. 12, 2019

(54) MANUFACTURES, METHODS AND APPARATUS FOR STRUCTURAL CELLULAR LIGHTWEIGHT CONCRETE

(71) Applicant: Tag Endeavors Inc., Lorena, TX (US)

(72) Inventors: Tami Ashley, Lorena, TX (US); James Ashley, Lorena, TX (US)

(73) Assignee: Tag Endeavors Inc., Lorena, TX (US)

( * ) Notice: Subject to any disclaimer, the term of this patent is extended or adjusted under 35 U.S.C. 154(b) by 0 days.

(21) Appl. No.: 16/236,310

(22) Filed: Dec. 28, 2018

Related U.S. Application Data

(63) Continuation-in-part of application No. 16/034,325, filed on Jul. 12, 2018.

(51) Int. Cl.
    *C04B 38/10* (2006.01)
    *C04B 40/00* (2006.01)
    *B28B 1/50* (2006.01)
    *C04B 28/04* (2006.01)

(52) U.S. Cl.
    CPC ............. *C04B 38/106* (2013.01); *B28B 1/50* (2013.01); *C04B 28/04* (2013.01); *C04B 40/0032* (2013.01); *C04B 40/0039* (2013.01); *C04B 2201/20* (2013.01); *C04B 2201/50* (2013.01)

(58) Field of Classification Search
    CPC ... C04B 28/04; C04B 38/106; C04B 40/0032; C04B 40/0039; C04B 2201/20; C04B 2201/50; B28B 1/50
    See application file for complete search history.

(56) References Cited

U.S. PATENT DOCUMENTS

| | | | | |
|---|---|---|---|---|
| 3,211,675 A | * | 10/1965 | Johnson | C04B 24/04 106/642 |
| 3,272,765 A | * | 9/1966 | Sefton | C04B 28/04 521/54 |
| 3,625,724 A | * | 12/1971 | Alvero | B28C 5/386 106/122 |
| 4,083,909 A | * | 4/1978 | Goransson | B28B 11/0818 264/82 |
| 6,264,735 B1 | * | 7/2001 | Bean | C04B 22/16 106/644 |
| 6,488,762 B1 | * | 12/2002 | Shi | C04B 28/02 106/676 |
| 6,620,236 B2 | * | 9/2003 | Huntsman | C04B 28/02 106/690 |
| 2002/0117086 A1 | * | 8/2002 | Shi | C04B 28/02 106/672 |

* cited by examiner

*Primary Examiner* — Anthony J Green
(74) *Attorney, Agent, or Firm* — Michael G. Smith, Esq.

(57) ABSTRACT

Manufactures, methods and apparatus are provided through which in some implementations a structural cellular lightweight concrete comprises a concrete mixture that is no more than 65% by volume of the manufacture of structural cellular lightweight concrete, the concrete mixture including concrete conforming to the requirements of ASTM C33; foam that has a density of at least 5 lbs./ft$^3$, having high stability characteristics, and having a closed cell bubble structure; mix water being potable and free of contamination or deleterious materials; and Portland cement conforming to ASTM C150, the Portland cement being Type I, Type III or White Portland cement, and at least 35% air by volume of the manufacture of structural cellular lightweight concrete.

9 Claims, 13 Drawing Sheets

MANUFACTURES, METHODS AND APPARATUS FOR STRUCTURAL CELLULAR LIGHTWEIGHT CONCRETE

RELATED APPLICATION

This application is a continuation-in-part of, and claims the benefit and priority under 35 U.S.C. 120 of co-pending U.S. Original patent application Ser. No. 16/034,325 filed 12 Jul. 2018, which is hereby incorporated by reference in its entirety.

FIELD

This disclosure relates generally to cellular lightweight concrete, and more particularly to structural cellular lightweight concrete.

BACKGROUND

Various manufactures of cellular lightweight concrete and devices for foaming concrete have been devised. Cellular concrete has not been used as a replacement for standard concrete as the removal of aggregate reduces it strength. Many uses for cellular have been discovered and are in standard practice. One of the numerous manufacturing issues is the lack of standardized quality control process as it relates to the production of precast elements, along with cast in-place processes. Numerous patents for various types and methods of production of cellular concrete have been issued. Shock Absorbing Concrete or (SACON®) was developed by the US Army Corps of Engineers to solve issues related to training with weapons. U.S. Pat. No. 6,264,735 (Bean et al., "the '735 patent") describes SACON® and the reduced lead-leaching from the SACON® ballistic concrete blocks. U.S. Pat. No. 6,620,236 (Huntsman et al., "the '236 patent") describes an improvement of the '735 patent formulation that includes an aluminum hydroxide additive to reduce or eliminate the erosion of heavy metals such as lead from the foamed concrete. A primary shortcoming of SACON® is that SACON® has no structural values and other limitations.

BRIEF DESCRIPTION

The above-mentioned shortcomings, disadvantages and problems are addressed herein, which will be understood by reading and studying the following specification.

An important aspect is the engineering values for structural cellular lightweight concrete (SCLC), which are included of the process described. Cellular concrete has remarkable properties. Designers/Owners that understand the benefits of a light-weight, extremely strong product, that is poured into place and is relatively inexpensive, enabling them to reap huge benefits. The cost and time savings for their projects can be huge. Structures built with SCLC last much longer than their wood framed counterparts, as the SCLC structures resist insects, are mold resistant, highly fire resistant, and have high impact resistance making the walls bullet proof/storm proof.

Attaining and achieving uniform structural density values is a very important key to the methods and apparatus described herein. All structural cellular lightweight concrete described in the detailed description below includes concrete conforming to the requirements of ASTM C33, foam having high stability closed cell bubble structure water, liquid foam agent and air, mix water being potable and free of contamination or deleterious materials, and Portland cement conforming to ASTM C150-11 (Standard Specification for Portland Cement) the Portland Cement, Type I, II, III, or IV or White Portland cement. Based on the combination of the amount and how the elements are combined/blended achieve a required density of between (25 lbs./ft$^3$ to 95 lbs./ft$^3$). The manufacturing process achieves a uniform value of 75 lbs./ft$^3$, with the resultant structural values.

DETAILED DESCRIPTION

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into six sections. In the first section, a method of making structural cellular concrete is described. In the second section, apparatus of implementations are described. In the fourth section, implementations of methods are described. In the fifth section, a hardware and the operating environment in conjunction with which implementations may be practiced are described. Finally, in the sixth section, a conclusion of the detailed description is provided.

Apparatus Implementations

In the previous section, a manufacture level overview of the operation of an implementation was described. In this section, the particular apparatus of such an implementation are described by reference to a series of diagrams.

Figure 1:
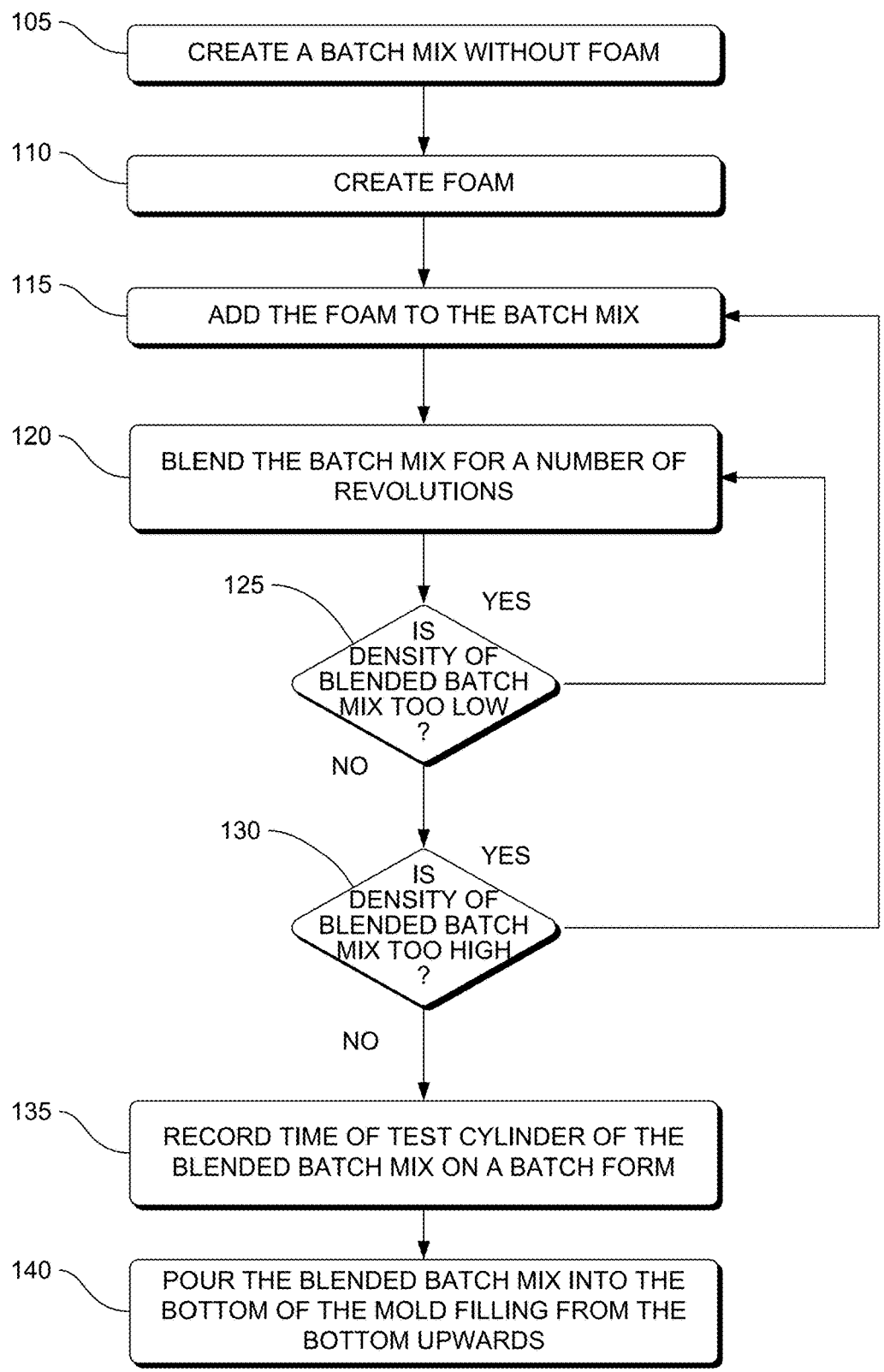
FIG. 1 is a block diagram of a method of manufacturing a structural cellular lightweight concrete, according to an implementation.

FIG. 1 is a block diagram of a method 100 of manufacturing a structural cellular lightweight concrete, according to an implementation. Method 100 includes creating a batch mix without foam, at block 105. In one implementation, the batch mix is composed of 1240 lbs. (about 58.1% by weight) of fine aggregate (such as concrete sand), 638 lbs. (29.9% by weight) of cement (such Portland cement that includes up to but no more than 25% fly ash) and 255 lbs. (12.0% by weight) of potable water. The amount of water varies if fly ash is used in the cement. Large aggregate (i.e rock) is not used in the batch mix or anywhere else in the manufactures, methods and apparatus disclosed herein.

Method 100 also includes creating foam from a foaming agent and from water, at block 110. The foaming agent complies with ASTM C 869, tested in accordance with ASTM 796. The foam that is created at block 110 incorporates millions of microscopic, about uniform or exactly uniform, closed cell air bubbles. The water shall be potable and no warmer than 90° Fahrenheit. The water shall be chilled to no more than 90° Fahrenheit if ambient temperature is greater than 90 degrees Fahrenheit.

Thereafter method 100 includes adding foam to the batch mix, at block 115 and then blending the batch mix for a proprietary number of revolutions, creating a blended batch mix, at block 120.

Thereafter method 100 includes checking if the blended batch mix is within an acceptable range of density and adjusting the blended batch mix if not by first checking whether or not the density of the blended batch mix is too low, at block 125. If the density of the blended batch mix is too low then the method 100 continues, at block 120, by blending the blended batch mix for the proprietary number of revolutions again so that the foam in the blended batch mix is compacted further, thus increasing the density of the blended batch mix, and thereafter the method 100 continues with once again determining if the density of the blended batch mix is too low, at block 125. When the density the blended batch mix is not too low the method 100 continues by determining whether the density of the blended batch mix is too high, at block 130. If the density of the blended batch mix is too high the method 100 continues, at block 115 by adding foam to the blended batch mix which will reduce the density of the blended batch mix, and thereafter the method 100 continues by blending the blended batch mix for the proprietary number of revolutions, at block 120. The method 100 continues once again determining if the density of the blended batch mix is too low at block 125 and if the density of the blended batch mix is not too low then the blended batch mix is tested to determine if the density is too high at block 130. In some implementations, the acceptable range of density of the blended batch mix is 75 lbs./ft$^3$±(1 lbs./ft$^3$).

Density tests can be performed for the slurry mixture on a test sample from, for every ready mix truck prior to the addition of foam. Batch report shall include the following information: Original ready-mix plant batch tickets, which will include the date, batch number, mix number, truck number, arrival time, volume of slurry received, pour time and the number of revolutions. Immediately upon arrival at the casting facility location an initial density test will be performed using a one-quarter cubic foot canister and a calibrated scale. The acceptable range of initial slurry density shall be 131 pounds per cubic foot (pcf) 3 PCF. The initial slurry density will be recorded on the QA documentation and submitted as part of the testing data. Density determination is to be performed in accordance with ASTM C138-10b. The batch form is an integral part of the manufacturing Quality Assurance process.

When the density of the blended batch mix is not too high, then the method 100 continues by recording the time of a test cylinder of the blended batch mix on a batch form, at block 135, and then pouring the blended batch mix into the bottom of a mold, at block 140, thus filling the mold from the bottom of the mold upwards, after a certain amount of time for curing, thereby creating the structural cellular lightweight concrete.

Most notably, method 100 for structural concrete does not include mixing with coarse aggregates or light aggregates. The structural cellular lightweight concrete has a greater amount of entrapped air than conventional concrete, wherein coarse aggregate and light aggregates is substituted with air bubbles. For example, method 100 can produce a 32 ft. high, load-bearing concrete panel for commercial building construction. The structural cellular lightweight concrete is suitable as load bearing members of buildings.

The structural cellular lightweight concrete also has high thermal mass properties that reduces heating and air/conditioning costs. This thermal resistance then provides a high degree of fire protection as the structural eight (8) inch thick wall provides over 5 hours of fire protection. Pre-fabricated stairwells and elevator shafts can be made meeting fire code standards. Panels can be used for ventilation shafts and any fire damper openings required can be designed into the panels.

Steel and reinforced concrete structural members can be protected with a layer of cellular concrete.

The duration of fire protection in relation to the oven-dry unit weigh and the panel thickness is shown in Table 1 below:

TABLE 1

| Oven-dry unit weight (lb/ft$^3$) | Panel thickness in inches | | | | |
|---|---|---|---|---|---|
| | 2" | 3" | 4" | 5" | |
| 25 to 30 | 2.2 to 2.8 | 2.8 to 3.3 | 3.3 to 3.8 | 3.8 to 4.2 | Hours of fire protection |
| | 2.8 to | 3.3 to | 3.9 to | 4.4 to | |
| 50 to 60 | 3.1 | 3.5 | 4.1 | 4.6 | |
| 70 to 80 | 3.1 to 3.4 | 3.8 to 4.2 | 4.4 to 4.8 | 4.9 to 5.4 | |
| 81-100+ | 4 | 5 | 5.8 | — | |

Properties of structural cellular lightweight concrete has high load bearing capacity, is easily pumpable, highly flowable, no compaction needed, has high insulation properties and high impact energy absorption. Structural cellular lightweight concrete is lightweight yet has high load bearing capacity and is stronger than soils or compacted fills. When structural cellular lightweight concrete is placed beneath structures, which is typically done for load reduction, the foundation can be redesigned for a dramatically stronger subgrade that is non-expansive and non-water-permeable—Structural cellular lightweight concrete is also more flexible and helps to solve specific construction challenges. Structural cellular lightweight concrete is easily pumpable because the high air content of structural cellular lightweight concrete makes the structural cellular lightweight concrete easy to pump long distances at low pressures because the air bubbles act like ball-bearings in the structural cellular lightweight concrete, which avoids excavating additional access pits to fill the pipe. When used for pipeline, structural cellular lightweight concrete fills the lengths of the pipe, which can easily extend thousands of feet. Conventional ready mix products see extreme pressures when pushed more than 200' and care must be taken when using these products for pipeline fills. Structural cellular lightweight concrete is also highly flowable and self-leveling which will flow into and fill any void. This reduces/eliminates compaction. The inspector typically takes a sample of the structural cellular lightweight concrete and watches for a few minutes before approval. structural cellular lightweight concrete requires no compaction, which reduces the cost of inspection when the contractor performs the quality control. Structural cellular lightweight concrete provides good to great insulation qualities. Structural cellular lightweight concrete also absorbs impact energy because during impact of an object against structural cellular lightweight concrete, resistance increases and then kinetic energy is absorbed. Structural cellular lightweight concrete also has high sound absorption qualities and greatly reduces noise between multi-family hotel rooms or apartments. In addition, the cost of structural cellular lightweight concrete is typically less than the cost of a ready mix product.

Structural cellular lightweight concrete can be used as lightweight insulated concrete roofing, building support, lateral loading, structural rehabilitation, trenches, hurricane zone structures and hillside residential foundations. In some implementations, structural cellular lightweight concrete can be used as lightweight insulated concrete roofing in a long-standing hybrid system that combines the high insulation value of expanded poly styrene (EPS) that provides the strength of cellular concrete. In this implementation, an EPS tapered system is installed to create the insulation value, then a 2-inch layer of 25 lbs./ft$^3$. structural cellular lightweight concrete is included that provides the roof a strong surface for the waterproofing layer to which to adhere. The savings in this implementation starts in the ability to build the structure with a simple flat roof, and then construct the slope-to-drain in the EPS. Savings continue since EPS and the structural cellular lightweight concrete are typically the least expensive insulation/sloping system. A long term benefit for the customer is that the insulation does not need to be replaced when reroofing the building. Structural cellular lightweight concrete can be used as building support in which the structural cellular lightweight concrete is placed in a uniform layer under the building that provides a strong non-expansive base and reduces the overall weight of the new structure. Structural engineers then can revise the foundation system for this stronger, more stable, non-expansive subgrade, which has nothing but advantages and no disadvantages, especially in challenging site conditions such as those near waterfronts and over soft soils. The structural cellular lightweight concrete can also be used for lateral loading, i.e. "zero lateral load" designs. For a structure that requires exterior retaining walls, replacing some amount of heavy soil on the outside of the structure significantly reduces the lateral loading in the design. A 25 pcf structural cellular lightweight concrete can be placed in relatively shallow lifts, thus creating minor lateral fluid pressure for about 6 hours. After the structural cellular lightweight concrete hardens, the cohesion is so strong there is no lateral loading applied to the retaining structure. Structural cellular lightweight concrete can also be used in rehabilitation work, where there are often voids under slabs, behind walls, or in newly constructed hidden areas. An example is a building constructed in a pit, in which the pit is backfilled with structural cellular lightweight concrete around each building after the below-grade portion is complete. Structural cellular lightweight concrete can also be used to construct trenches, such as utility trenches that also require backfilling, in which a large number of pipes within a trench pose a challenge for proper fill and compaction. These areas can be filled with highly fluid structural cellular lightweight concrete. This method is relatively easy and clean (no wheelbarrows). The work above the fill can proceed the next work day. In multi-family new structures (hotels, apartments, assisted living areas) there are numerous utilities trenches and pipes, a 2-inch layer of 25 pcf. cellular concrete insulates the space and holds pipes in position as the 2-inch layer of 25 pcf. cellular concrete self-levels. The reinforcement is then laid out and the foundation is poured normally. Structural cellular lightweight concrete can also be used for structures in hurricane zones because the building panels that are made of structural cellular lightweight concrete as the building panels can withstand the high wind loads. Used as stem walls for flood plan zone, structural cellular lightweight concrete can reduce the potential damages caused by flooding. Structural cellular lightweight concrete can also be used in hillside residential foundations because a new home built on a hill a typically requires deep piles typically spaced 8 feet apart or alternatively, excavation of a trench at foundation lines down to bedrock and then backfilled with structural cellular lightweight concrete. In some cases, savings of over 75% have been realized, with a dramatically more stable foundation system as the structural cellular lightweight concrete interlocks with the bedrock over larger areas. The foundation system should then be revised according to the new subgrade. Structural cellular lightweight concrete can further be used for insulated pipelines.

The structural cellular lightweight concrete that is produced by the methods in FIGS. 1 and 11-12 and the apparatus of FIG. 2-10 and 13 conforms to Building Code Requirements for Structural Concrete (ACI 318R-14), September 2014, ISBN: 978-0-87031-930-3, American Concrete Institute, 38800 Country Club Drive, Farmington Hills, Mich. 48331 as follows:

For each applicable factored load combination, the design strength at all sections shall satisfy $\phi S_n \geq U$, including:

(a) through (c). Interaction between axial load and moment is considered.

(a) $\phi P_n \geq Pu$
(b) $\phi M_n \geq Mu$
(c) $\phi V_n \geq Vu$ $S_n$=nominal moment, shear, axial, torsional, or bearing strength $\phi$ is strength reduction factors.

For bearing walls, $P_n$ is axial load and $M_n$ is in-plane or out-of-plane flexure. Alternatively, axial load and out-ofplane flexure is permitted to be considered for Axial load and out-of-plane flexure—according to the following simplified design method:

If the resultant of all factored loads is located within the middle third of the thickness of a solid wall with a rectangular cross section, $P_n$ is permitted to be calculated by Formula 1 below:

$$P_n = 0.55 f'_c A_g \left[1 - \left(\frac{k\ell_c}{32h}\right)^2\right] \quad \text{Formula 1}$$

The simplified design method applies only to solid rectangular cross sections. Eccentric axial loads and moments due to out-of-plane forces are used to determine the maximum total eccentricity of the factored axial force $P_u$. When the resultant axial force for all applicable load combinations falls within the middle third of the wall thickness (eccentricity not greater than h/6) at all sections along the length of the undeformed wall, no tension is induced in the wall and the simplified design method may be used. The design is then carried out considering $P_u$ as a concentric axial force. The factored axial force Pu should be less than or equal to the design axial strength $\phi P_n$ calculated using Formula 1.

Figure 1B:
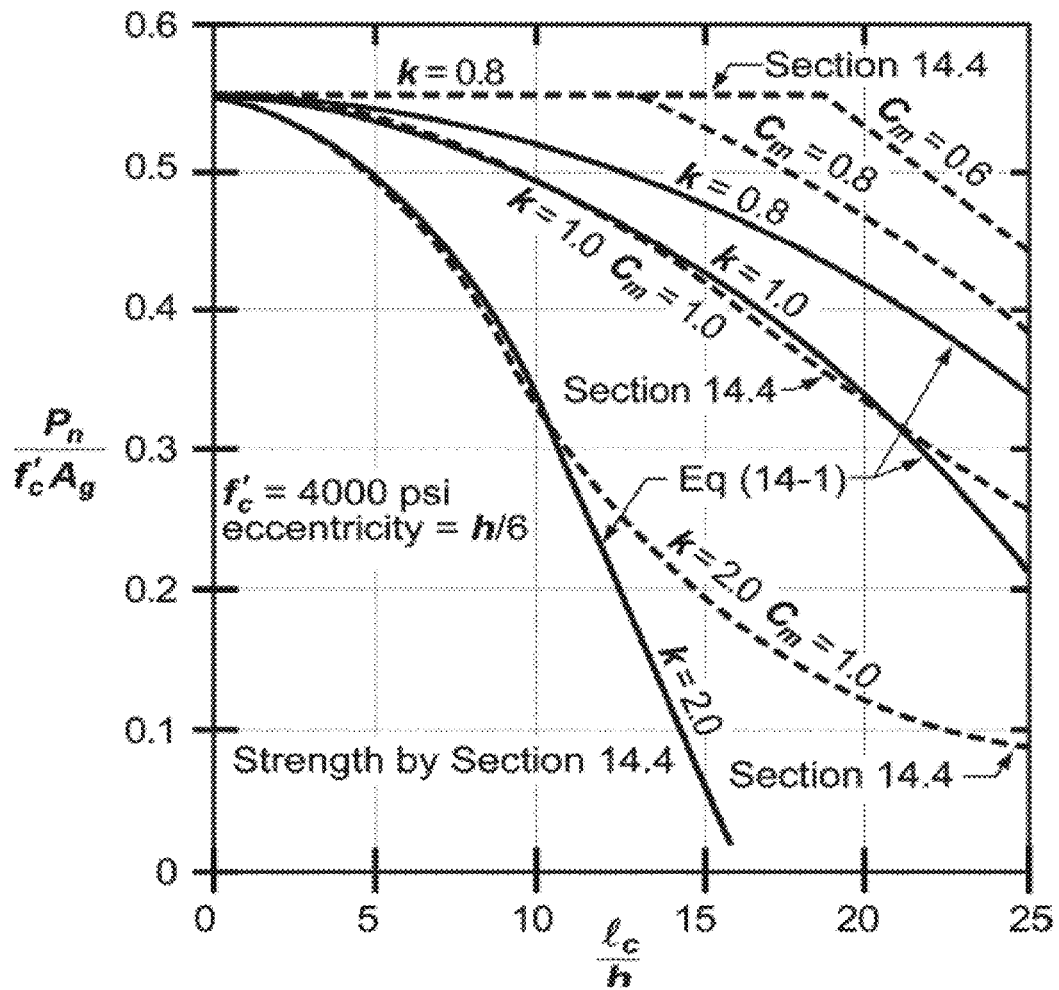
FIG. 1B is a table showing strengths for members loaded at the middle third of the thickness with different braced and restrained end conditions.

Formula 1 results in strengths for members loaded at the middle third of the thickness with different braced and restrained end conditions is shown in FIG. 1B.

Effective length factor k for use with Formula 1 is in accordance with the Table 2 below:

TABLE 2

| Effective Length Factor k for Walls | |
|---|---|
| Boundary conditions | k |
| Walls braced top and bottom against lateral translation and: | |
| (a) Restrained against rotation at one or both ends (top, bottom, or both) | 0.8 |
| (b) Unrestrained against rotation at both ends | 1.0 |
| Walls not braced against lateral translation | 2.0 |

$P_n$ from Formula 1 is reduced by $\phi$ for compression-controlled sections. Wall reinforcement is at least that required by reinforcement limits.

For in-plane shear, $V_n$ is calculated as shown below for in-plane shear. Alternatively, for walls with hw≤2 lw, it is permitted to design for in-plane shear in accordance with the strut-and-tie method. Shear in the plane of the wall is primarily of importance for structural walls with a small height-to-length ratio. The design of taller walls, particularly walls with uniformly distributed reinforcement, will likely be controlled by flexural considerations. Possible exceptions may occur in tall structural walls subject to strong earthquake excitation.

For in-plane shear design, h is thickness of wall and d is taken equal to 0.8 lw. A larger value of d, equal to the distance from extreme compression fiber to center of force of all reinforcement in tension, is permitted if the center of tension is calculated by a strain compatibility analysis.

Vn at any horizontal section shall not exceed $$10\sqrt{f'_c}\, hd.$$

Vn is calculated by: Vn=Vc+Vs. This limit is imposed to guard against diagonal compression failure in shear walls.

Unless a more detailed calculation is made, Vc shall not exceed $$2\lambda\sqrt{f'_c}\, hd$$

for walls subject to axial compression or exceed the value given in for walls subject to axial tension, for nonprestressed members with significant axial tension, Vc shall be calculated by:

$$V_c = 2\left(1 + \frac{N_u}{500 A_g}\right) \lambda \sqrt{f'_c}\, b_w d$$

where Nu is negative for tension, and Vc shall not be less than zero.

It is permitted to calculate Vc in accordance with Table 3, where Nu is positive for compression and negative for tension, and the quantity Nu/Ag is expressed in psi.

TABLE 3

| Vc: Nonprestressed and Prestressed Walls | | | | |
|---|---|---|---|---|
| Calculation option | Axial force | | $V_c$ | |
| Simplified | Compression | | $2\lambda\sqrt{f'_c hd}$ | (a) |
| | Tension | Greater of: | $2\left(1 + \frac{N_u}{500 A_g}\right)\lambda\sqrt{f'_c hd}$ | (b) |
| | | | 0 | (c) |
| Detailed | Tension or compression | Lesser of: | $3.3\lambda\sqrt{f'_c hd} + \frac{N_u d}{4\ell_w}$ | (d) |
| | | | $\left[0.6\lambda\sqrt{f'_c} + \dfrac{\ell_w\left(1.25\lambda\sqrt{f'} + 0.2\dfrac{N_u}{\ell_w h}\right)}{\dfrac{M_u}{V_u} - \dfrac{\ell_w}{2}}\right] hd$ | (e) |

Equation shall not apply if $(M_u/V_u - \ell_w/2)$ is negative.

Expressions (a) through (e) in Table 3 may be used to determine Vc at any section through a shear wall. Expression (d) corresponds to the occurrence of web shear cracking at a principal tensile stress of approximately $$4\lambda\sqrt{f'_c}$$

at the centroid of the shear wall cross section. Expression (e) corresponds approximately to the occurrence of flexure-shear cracking at a flexural tensile stress of 6λ f c at a section lw/2 above the section being investigated. As the term (Mu/Vu−lw/2) decreases, (d) will control; (d) should be used even when this term becomes negative.

Sections located closer to wall base than a distance lw/2 or one-half the wall height, whichever is less, is permitted to be designed for Vc calculated using the detailed calculation options in Table 3 at a distance above the base of lw/2 or one-half the wall height, whichever is less.

The values of Vc calculated from (d) and (e) in Table 3 at a section located a distance above the base of lw/2 or hw/2, whichever is lesser, apply to that section and all sections between it and the base. However, the maximum factored shear force Vu at any section, including the base of the wall, is limited to the upper bound on Vn in accordance Vn at any horizontal section shall not exceed $$10\sqrt{f'_c}\,hd.$$

Vs is provided by transverse shear reinforcement and is calculated by:

$$V_s = \frac{A_v f_{yt} d}{s}$$

Figure 2:
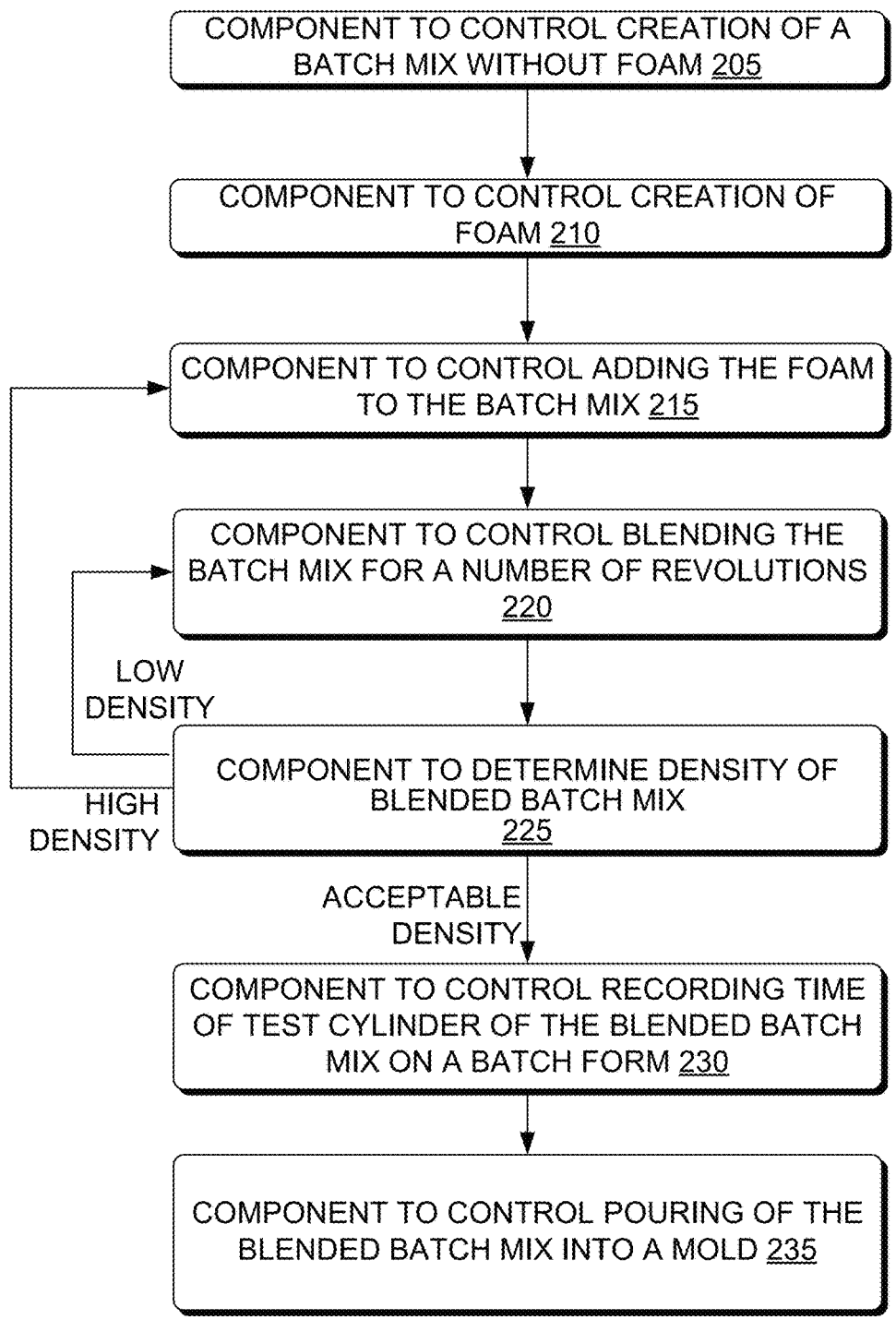
FIG. 2 is a block diagram of computer-enabled components to control apparatus to generate foam for structural or cellular lightweight concrete, according to an implementation.

FIG. 2 is a block diagram of computer-enabled components 200 to control apparatus to generate foam for structural or cellular lightweight concrete, according to an implementation. The computer-enabled components 200 include a component that is able to control creation of a batch mix without foam, according to an implementation at block 205. In some implementations, component 205 performs block 105 in FIG. 1.

The computer-enabled components 200 in FIG. 2 also includes a component that is able to control creation of foam, according to an implementation at block 210. In some implementations, component 210 performs block 110 in FIG. 1. In some implementations, component 210 performs method to generate foam for structural cellular lightweight concrete in FIG. 11. In some implementations, component 210 performs block 1202 in FIG. 12. In some implementations, component 210 controls the apparatus to generate foam for structural cellular lightweight concrete in FIG. 3. In some implementations, component 210 controls the apparatus 400 in FIG. 4 to generate foam for structural cellular lightweight concrete. In some implementations, component 210 controls the apparatus 500 in FIG. 5 to generate foam for structural cellular lightweight concrete. In some implementations, component 210 controls the structural cellular lightweight concrete trailer 600 in FIG. 6. In some implementations, component 210 controls the structural cellular lightweight concrete trailer 700 in FIG. 7.

The computer-enabled components 200 also include a component that is able to control adding the foam to the batch mix, according to an implementation at block 215. In some implementations, component 215 performs block 115 in FIG. 1. The computer-enabled components 200 also include a component that is able to control blending the batch mix for a number of revolutions, according to an implementation at block 220. In some implementations, component 220 performs block 120 in FIG. 1. In some implementations, component 220 performs block 1204 in FIG. 12. The computer-enabled components 200 also include a component that is able to determine density of the blended batch mix, according to an implementation at block 225. In some implementations, component 225 performs the blocks 125 and 130 in FIG. 1. The computer-enabled components 200 also include a component that is able to control recording time of test cylinder of the blended batch mix on a batch form, according to an implementation at block 230. In some implementations, component 230 performs block 135 in FIG. 1. The computer-enabled components 200 also include a component that is able to control pouring of the blended batch mix into a mold, according to an implementation at block 235. In some implementations, component 235 performs the block at 140 in FIG. 1. The computer-enabled components 200 can be implemented as one of the application programs 1332 in FIG. 13.

Figure 3:
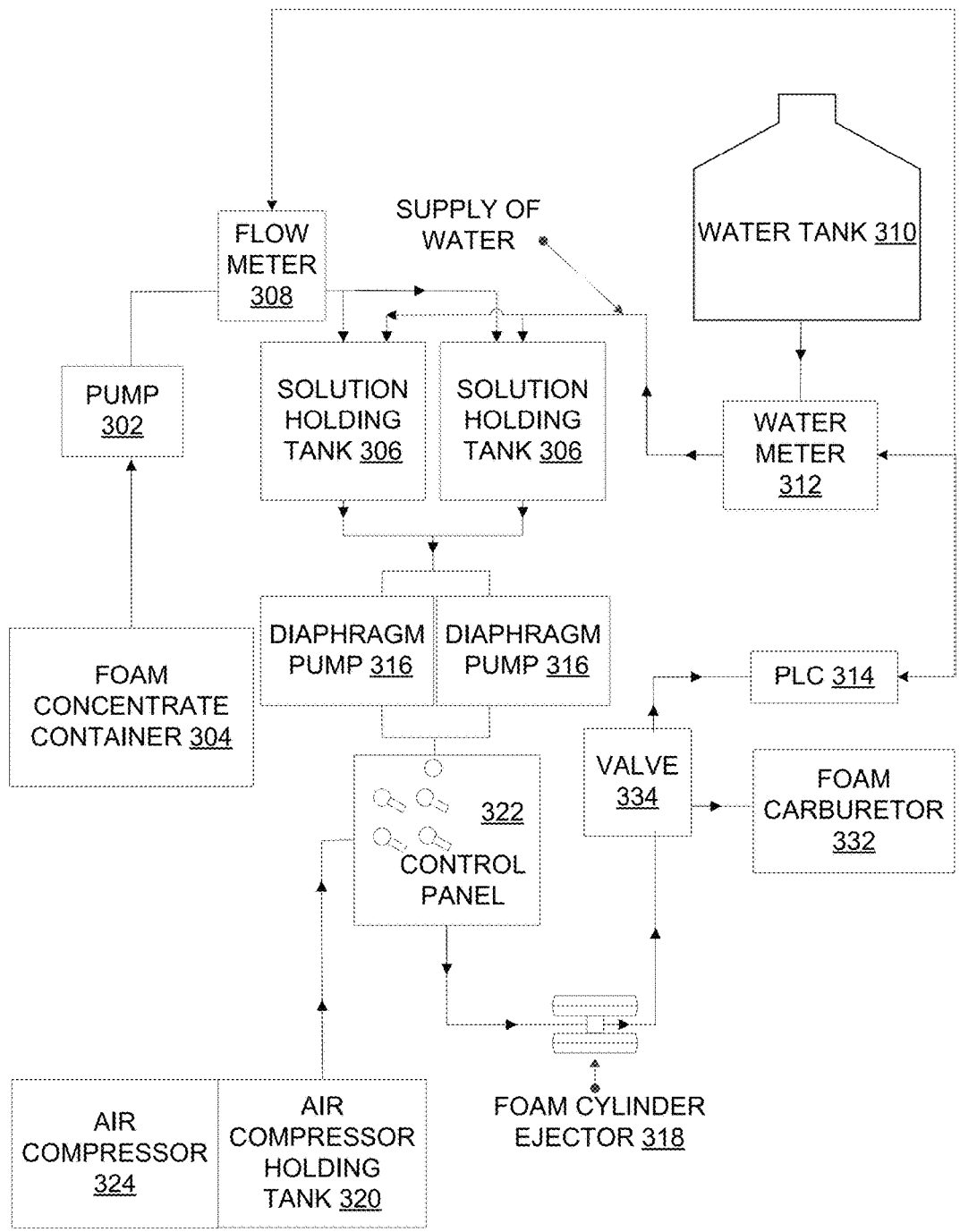
FIG. 3 is a block diagram of an apparatus to generate foam for structural cellular lightweight concrete, according to an implementation.

FIG. 3 is a block diagram of apparatus 300 to generate foam for structural cellular lightweight concrete according to an implementation.

In apparatus 300, a foam generating solution is made by mixing a liquid foam agent with water according to a mixture ratio. Apparatus 300 includes a diaphragm pump 302 that pumps the liquid foam agent from a container 304, such as a 55 gallon drum, to two 200 gallon tanks 306. The pumped liquid foam agent passes through a flow meter 308 that measures a rate of flow in order to obtain the mixture ratio of liquid foam agent and water that is filled into the 200 gallon tanks 306. Water flows from an outflow port at the bottom of a water tank 310 to a water meter 312. The water tank 310 holds about a constant amount of water, thus providing about a constant amount of pressure of the water. In some implementations, the water meter 312 is an electronic magnetic drive water meter. A PLC (programmable logic controller) 314 communicates with the flow meter 308 and the water meter 312 to determine and control the amount of liquid foam agent and water being filled into each of the two 200 gallon tanks 306. As a result the solution of liquid foam agent and water in each of the tanks 306 is accurately measured and controlled to maintain the desired ratio of liquid foam agent to water in the solution. The liquid foam agent is mixed in the non-pressurized 200 gallon tanks 306 to provide a uniform solution mixture throughout the entire filled volume of the tanks.

At least one of two diaphragm pumps 316 pump and pressurize the solution from the tanks 306, through a foam cylinder ejector 318. An air compressor holding tank 320 adjusts the volume of the solution air pressure that is delivered from controls on a foam control panel 322. An air compressor 324 replenishes a supply of pressurized air that is contained in the holding tank 320 to maintain the air pressure within a certain tolerance. The foam volume and density is adjusted by regulating the air injection and solution flow rate as the air and solution enter the foam cylinder ejector 318. In the ejector 318, the desired amount of air and solution are combined under pressure. The pressurized flow of air/solution mixture exiting the foam cylinder ejector 318 enters a foam carburetor 328 for generating a foam product.

Specifically, the pressurized flow of air/solution mixture is mechanically impacted with beads 330 within the foam carburetor 332 which creates the foam product. The PLC 314 regulates the amount of foam product per batch via a pneumatic ball valve 334. Some of the key elements in FIG. 3 are the flow meter 308, the water meter 312, the diaphragm pumps 316, the control panel 322, the valve 2 and the PLC 314 that allow flow of the water the liquid foam agent to precise levels that allow a consistent and high amount of air to be mixed in with the liquid foam agent and the water. Most importantly, the consistent and high amount of air that is mixed in with the liquid foam agent and the water provides a high amount of air pockets are consistently spaced apart from each other. The high amount of air pockets provides high thermal insulation properties and the consistent spacing of the air pockets provides higher strength properties for the amount of air pockets. Conventionally, high insulation properties results in lower strength properties because consistent spacing of the air pockets is not conventional. But the consistent spacing of the air pockets counteracts the weakening effect of the high amount of air in the foam.

Figure 4:
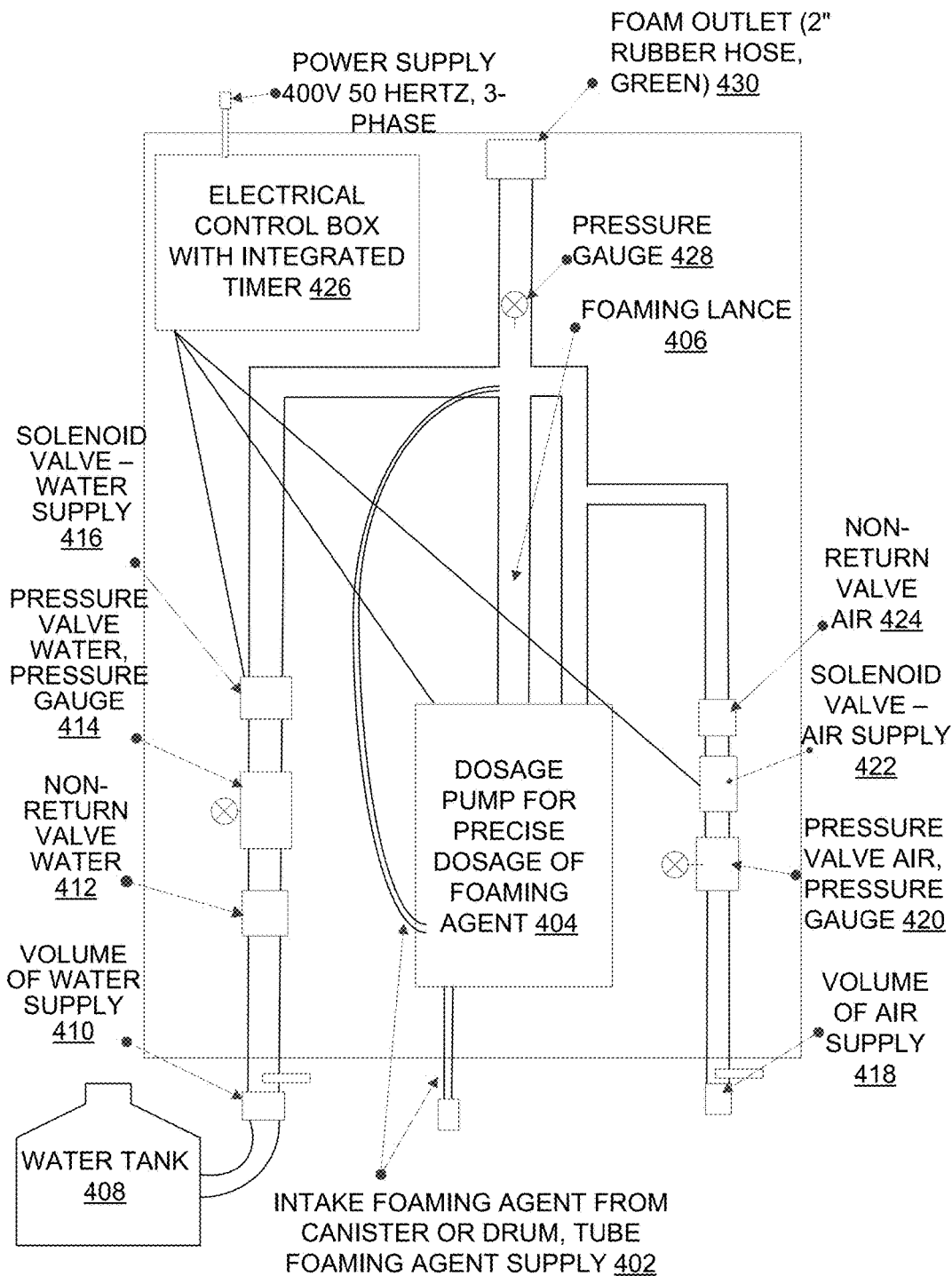
FIG. 4 is a block diagram of an apparatus to generate foam for structural cellular lightweight concrete, according to an implementation.

FIG. 4 is a block diagram of an apparatus 400 to generate foam for structural cellular lightweight concrete, according to an implementation. Apparatus 400 includes an intake foaming agent 402 that is supplied from a canister, drum, tube or a foaming agent supply that feeds a foaming agent to a dosage pump 404 for precise dosage of the foaming agent. The dosage pump 404 is operably coupled to a foaming lance 406. Apparatus 400 also includes a water tank 408 that feeds a volume of water supply 410 to a non-return valve 412 which is in turn operably coupled to a pressure valve water pressure gauge 414. The pressure valve water pressure gauge 414 is operably coupled to a solenoid valve water supply 416. The apparatus 400 also includes a volume of air supply 418 that feeds into a pressure valve air pressure gauge 420 that is in turn operably coupled to a solenoid valve air supply 422 which is in turn operably coupled to a non-return valve for air 424. The water supplied by the solenoid valve water supply 416 and the foaming agent supplied by the foaming lance 406 and the air supply by the non-return valve air 424 are regulated by an electrical control box with an integrated timer 426. A pressure gauge 428 measures the pressure of the combined water foaming agent and air that exits from a foam outlet 430.

Figure 5:
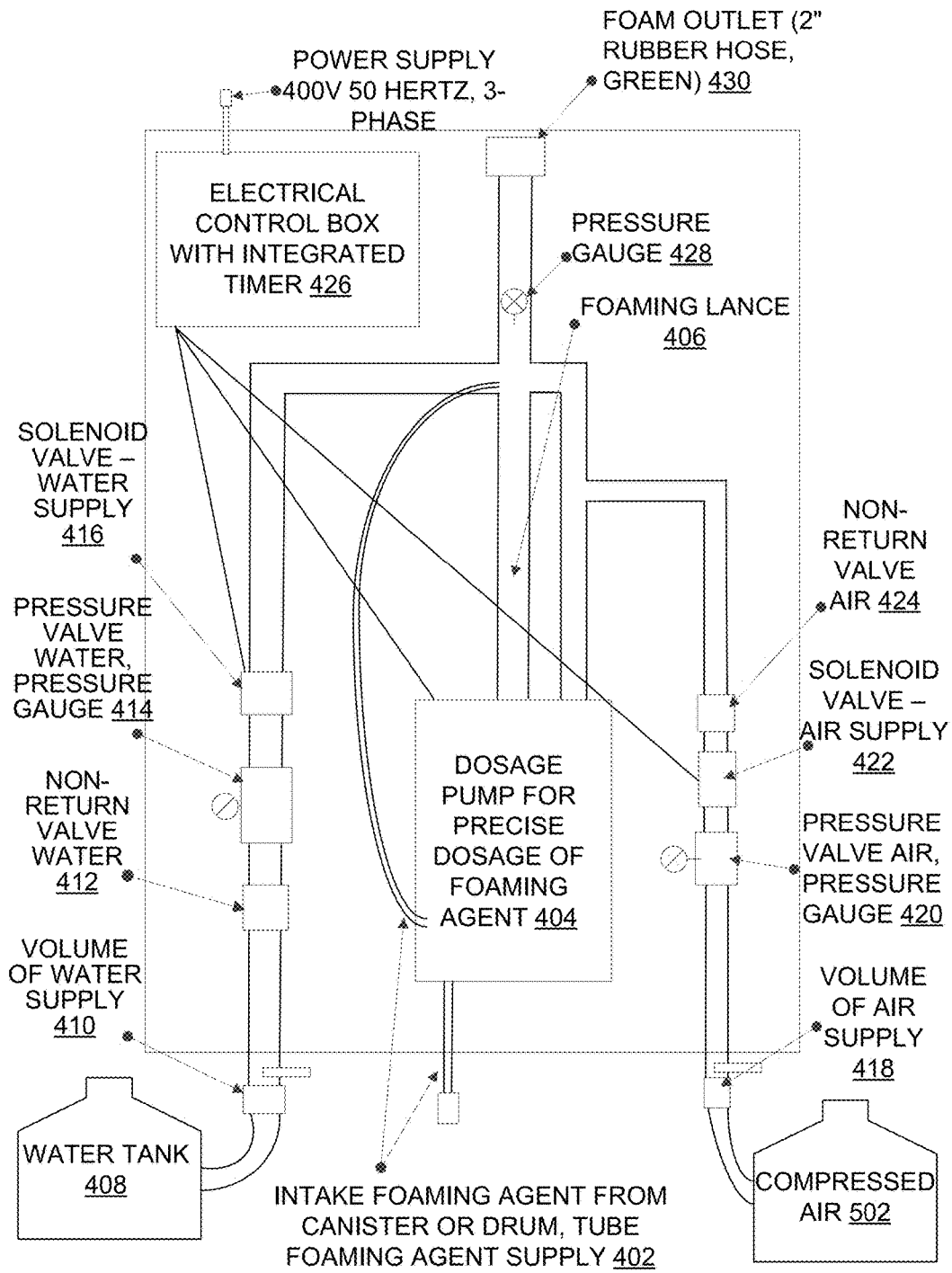
FIG. 5 is a block diagram of an apparatus to generate foam for structural cellular lightweight concrete, according to an implementation.

FIG. 5 is a block diagram of an apparatus 500 to generate foam for structural cellular lightweight concrete, according to an implementation. Apparatus includes a tank of compressed air 502 that supplies compressed air as the volume of air supply 418.

Figure 6:
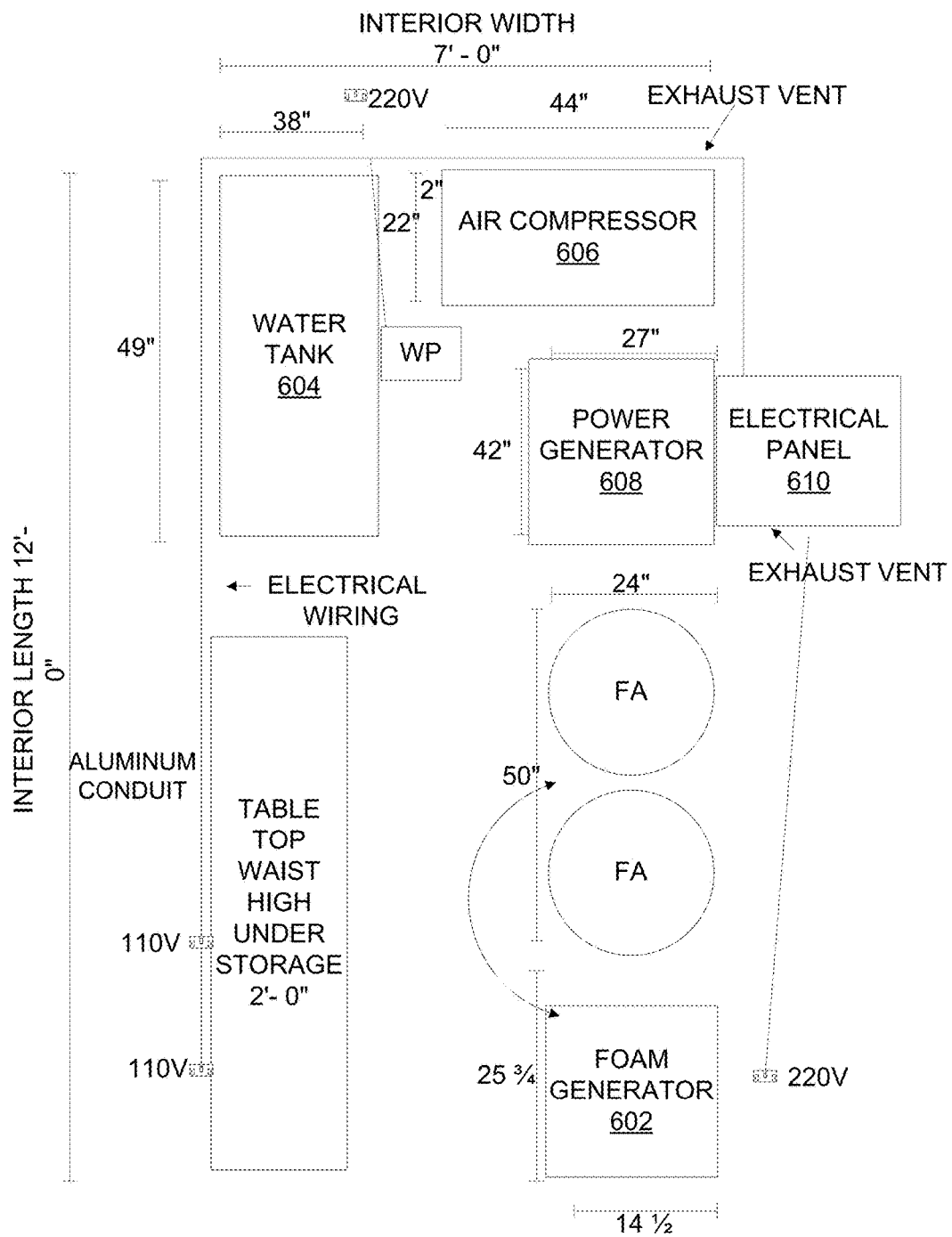
FIG. 6 is a block diagram of a structural cellular lightweight concrete trailer, according to an implementation.

FIG. 6 is a block diagram of a structural cellular lightweight concrete trailer 600, according to an implementation. The structural cellular lightweight concrete trailer 600 includes a concrete foam generator 602. Examples of the concrete foam generator 602 include the apparatus 300 to generate foamed structural cellular lightweight concrete in FIG. 3, the apparatus 400 to generate phone structural cellular lightweight concrete in FIG. 4 and the apparatus 500 to generate structural cellular lightweight concrete in FIG. 5. The structural cellular lightweight concrete trailer 600 also includes a water tank 604 that is operably coupled to the concrete foam generator 602. The structural cellular lightweight concrete trailer 600 also includes an air compressor 606 that is operably coupled to the concrete foam generator 602. The structural cellular lightweight concrete trailer 600 also includes a power generator 608 that is controlled by an electrical panel 610. The power generator is operably coupled to the concrete foam generator 602. The dimensions shown in FIG. 6 are merely exemplary and not limiting.

Figure 7:
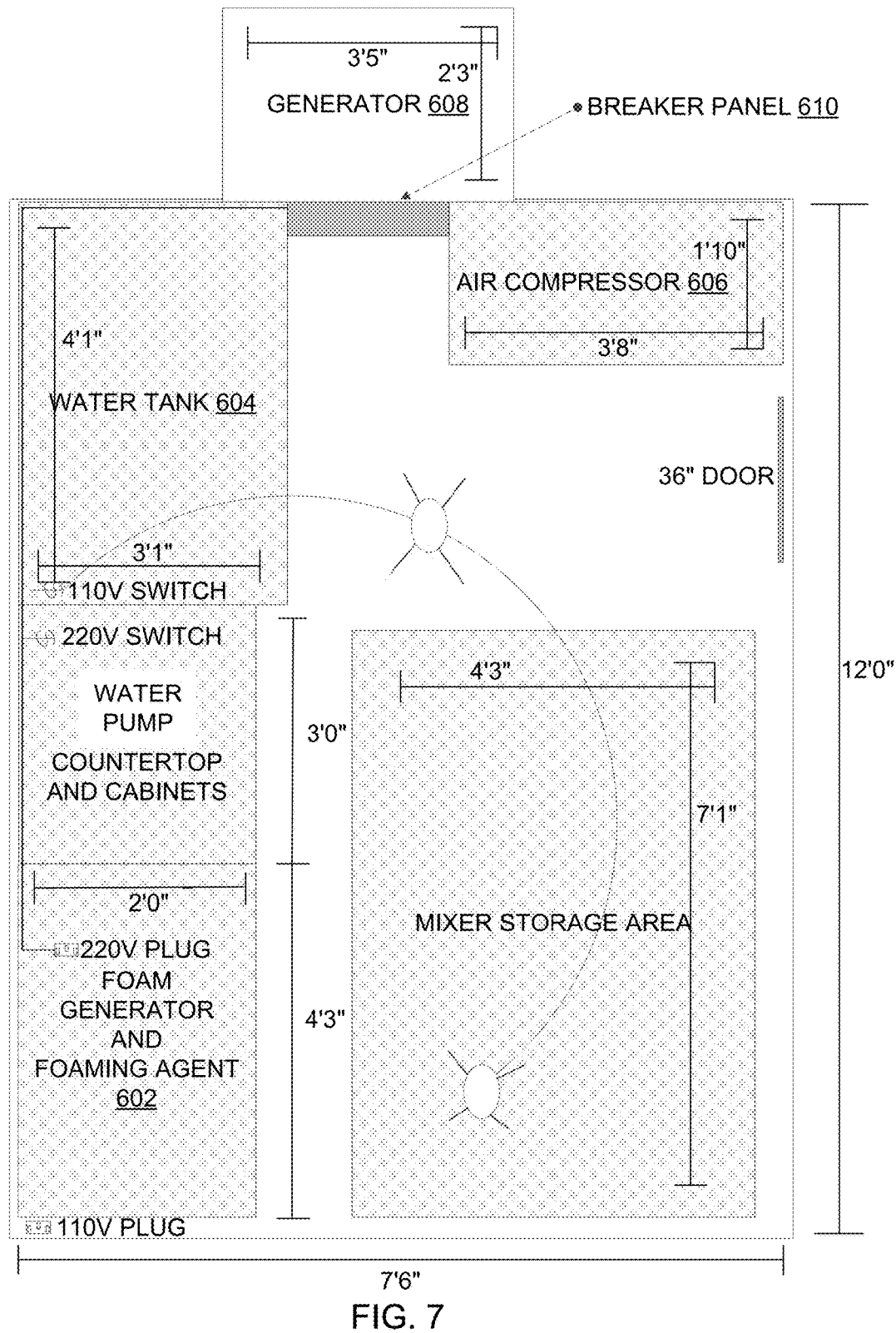
FIG. 7 is a block diagram of a structural cellular lightweight concrete trailer, according to an implementation.

FIG. 7 is a block diagram of a structural cellular lightweight concrete trailer 700, according to an implementation. The structural cellular lightweight concrete trailer 700 includes a concrete foam generator 702. Examples of the concrete foam generator 702 include the apparatus 300 to generate foamed structural cellular lightweight concrete in FIG. 3, the apparatus 400 to generate phone structural cellular lightweight concrete in FIG. 4 and the apparatus 500 to generate structural cellular lightweight concrete in FIG. 5. The structural cellular lightweight concrete trailer 700 also includes a water tank 704 that is operably coupled to the concrete foam generator 702. The structural cellular lightweight concrete trailer 700 also includes an air compressor 706 that is operably coupled to the concrete foam generator 702. The structural cellular lightweight concrete trailer 700 also includes a power generator 708 that is controlled by a breaker panel 710. The power generator is operably coupled to the concrete foam generator 702. The dimensions shown in FIG. 7 are merely exemplary and not limiting.

Figure 8:
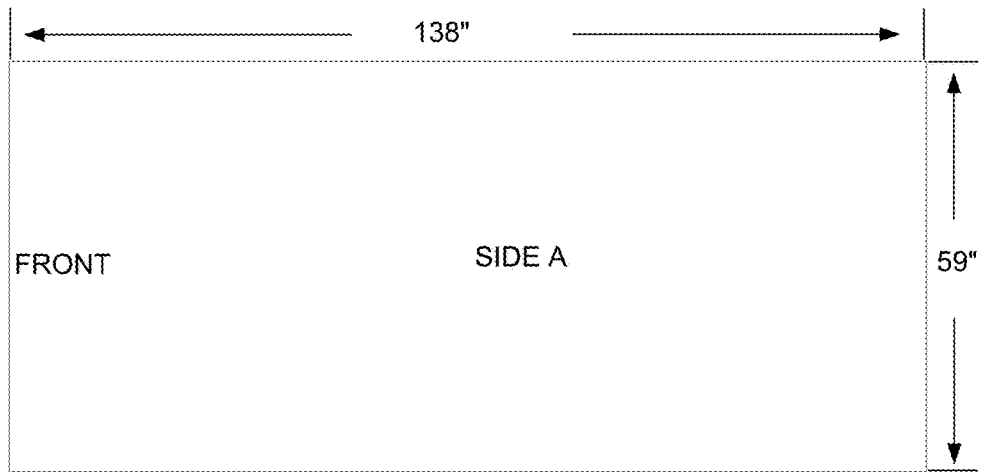
FIG. 8 is a block diagram of a side view of a structural cellular lightweight concrete trailer, according to an implementation.

FIG. 8 is a block diagram of a side view of a structural cellular lightweight concrete trailer 800, according to an implementation. FIG. 8 shows Side A of the structural cellular lightweight concrete trailer 800.

Figure 9:
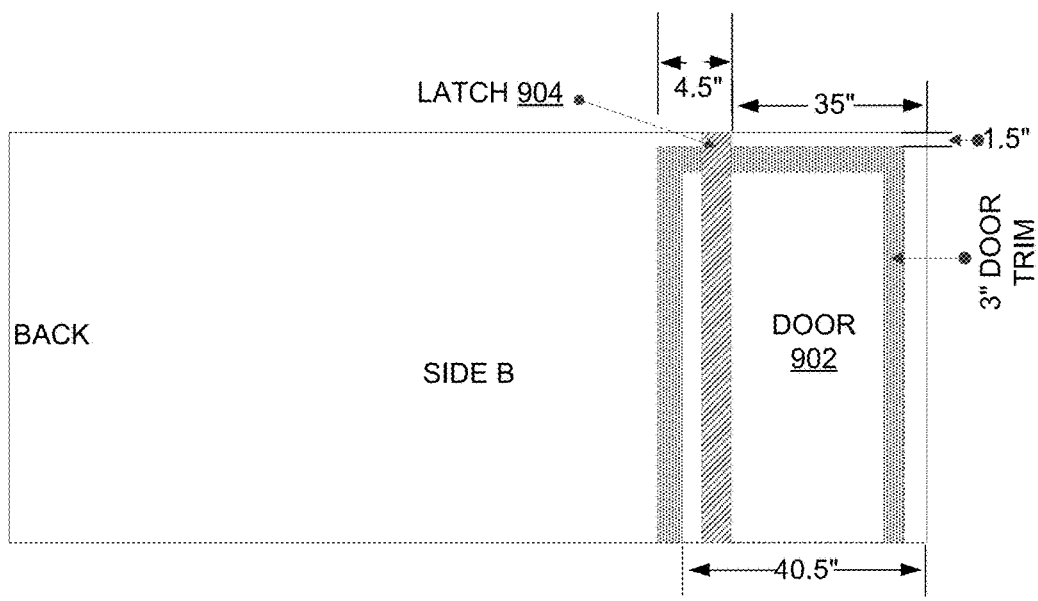
FIG. 9 is a block diagram of a side view of a structural cellular lightweight concrete trailer, according to an implementation.

FIG. 9 is a block diagram of a side view of a structural cellular lightweight concrete trailer 800, according to an implementation. FIG. 9 shows Side B of the structural cellular lightweight concrete trailer 800 that includes a door 902 and a latch 904 of the door 902.

Figure 10:
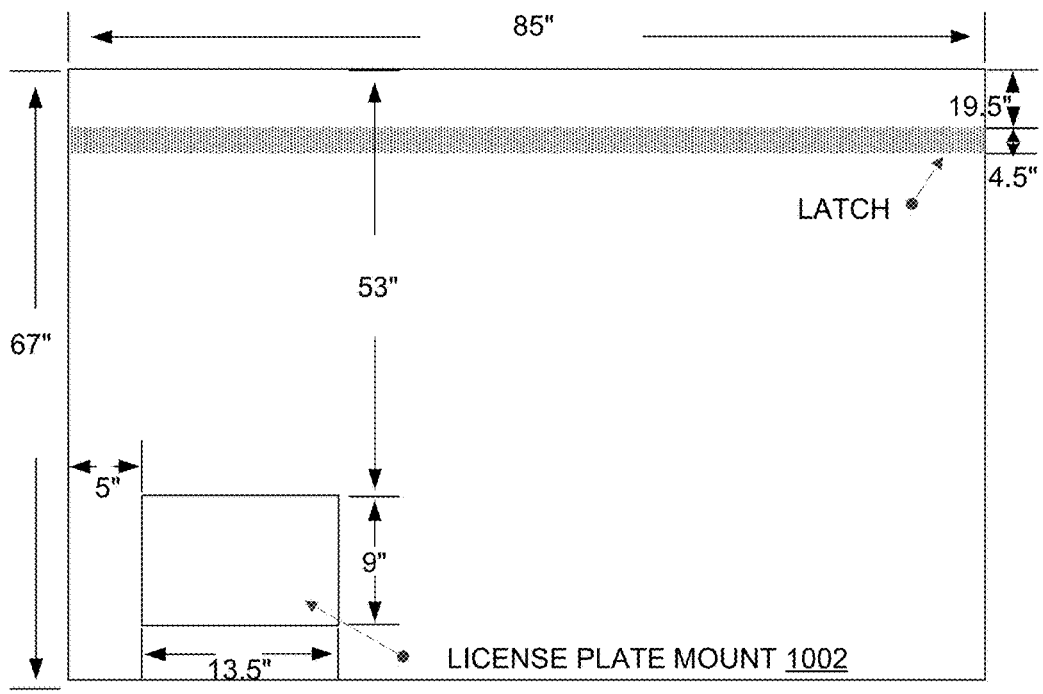
FIG. 10 is a block diagram of a back view of a structural cellular lightweight concrete trailer, according to an implementation.

FIG. 10 is a block diagram of a back view of a structural cellular lightweight concrete trailer 800, according to an implementation. The structural cellular lightweight concrete trailer 800 includes a license plate mount 1002.

Method Implementations

In the previous section, apparatus of the operation of an implementation was described. In this section, the particular methods performed by apparatus 300, 400, 500, 600, 700 and 1300 of such an implementation are described by reference to a series of flowcharts.

Figure 11:
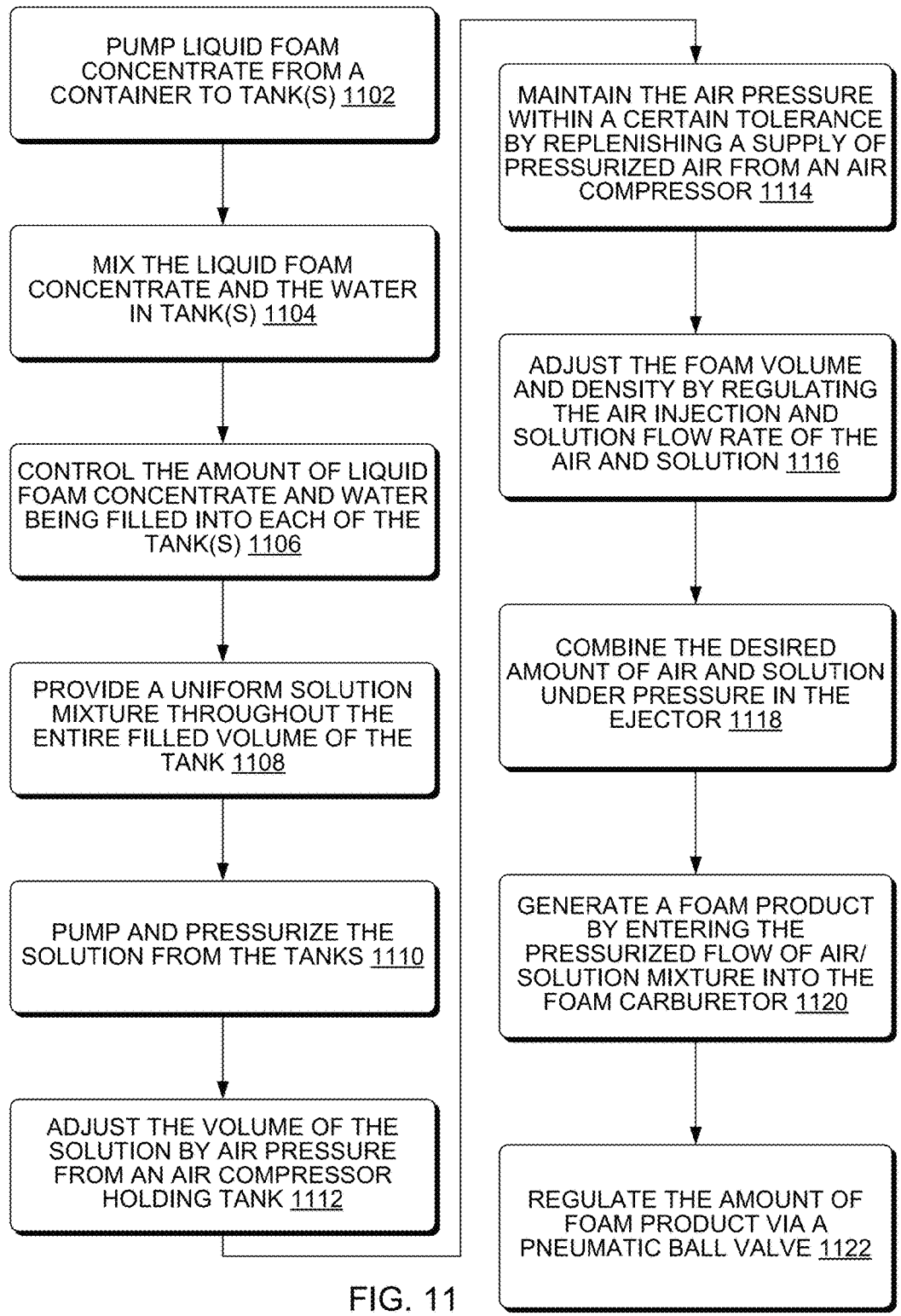
FIG. 11 is a flowchart of a method performed by apparatus 300 in FIG. 3 to generate foam for structural cellular lightweight concrete, according to an implementation.

FIG. 11 is a flowchart of a method 1100 performed by apparatus 300 in FIG. 3 to generate foam for structural cellular lightweight concrete, according to an implementation. Method 1100 provides a foam for structural cellular lightweight concrete. Method 1100 includes pumping 1102 the liquid foam agent by the diaphragm pump 302 from a container 304, such as a 55 gallon drum, to two 300 gallon tanks 306. The liquid foam agent must not be a synthetic foam agent. The liquid foam agent must only be a 5 lb./ft$^3$ foam agent. The liquid foam agent must only include organic materials such as tree gum or horse ingredients) and having a thicker consistency. Method 1100 includes 1104 mixing the liquid foam agent and the water in the 200 gallon tanks 306 according to the mixture ratio by passing the liquid foam agent through the flow meter 308 that measures a rate of flow and by passing the water through the water meter 312 that measures a rate of flow. Method 1100 includes 1106 controlling the amount of liquid foam agent and water being filled into each of the two 300 gallon tanks 306 by the PLC 314 communicating with the flow meter 308 and the water meter 312, as a result the solution of liquid foam agent and water in each of the tanks 306 is accurately measured and controlled to maintain the desired ratio of liquid foam agent to water in the solution. Method 1100 includes 1108 providing a uniform solution mixture throughout the entire filled volume of the tank by mixing the foaming agent in the non-pressurized 300 gallon tanks 306. Method 1100 includes pumping and pressurizing 1110 the solution from the tanks 306 by at least one of two diaphragm pumps 316, is by through a foam cylinder ejector 318. Method 1100 includes adjusting 1112 the volume of the solution by air pressure that is delivered by an air compressor holding tank 320 through controls on a foam control panel 322. Method 1100 includes maintaining 1114 the air pressure within a certain tolerance by replenishing a supply of pressurized air that is contained in the holding tank 320 by an air compressor 324. Method 1100 includes adjusting 1116 the foam volume and density by regulating the air injection and solution flow rate as the air and solution enter the foam cylinder ejector 318. Method 1100 includes combining 1118 the desired amount of air and solution under pressure in the ejector 318. Method 1100 includes generating 1120 a foam product by entering into the foam carburetor 328 the pressurized flow of air/solution mixture from the foam cylinder ejector 318, by mechanically impacting the pressurized flow of air/solution mixture with beads 330 within the foam carburetor 332 to create the foam product. Method 1100 includes regulating 1122 the amount of foam product per batch via a pneumatic ball valve 334 by the PLC 314.

Figure 12:
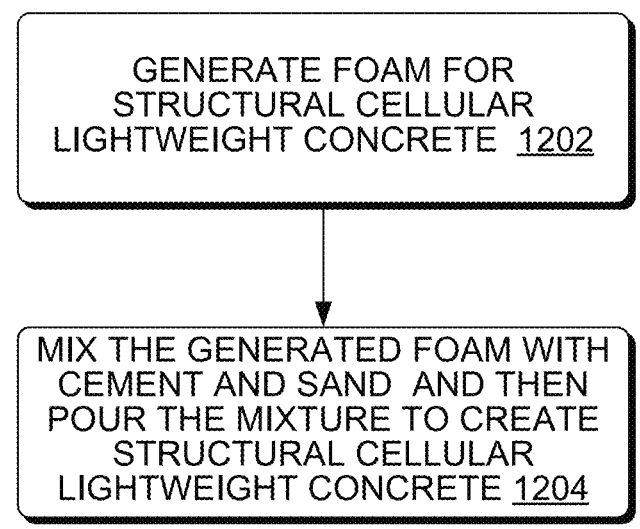
FIG. 12 is a flowchart of a method performed by apparatus 300 in FIG. 3 and a cement mixer to produce structural cellular lightweight concrete, according to an implementation.

FIG. 12 is a flowchart of a method 1200 performed by apparatus 300 in FIG. 3 and a cement mixer to produce structural cellular lightweight concrete, according to an implementation.

Method 1200 includes generating foam for structural cellular lightweight concrete at block 1202. One example of generating foam for structural cellular lightweight concrete at block 1202 is method 1100 in FIG. 11.

Method 1200 also includes mixing the foam generated at block 1202 with cement and sand in a cement mixer, according to the ratios in Table 4 or Table 5 below, and then pouring the mixed foam, cement and sand.

TABLE 4

Mix Design Table (cuyd)

| | | | | | | | |
|---|---|---|---|---|---|---|---|
| Density (kg/m³) | 400 | 600 | 800 | 1000 | 1200 | 1400 | 1600 |
| Density (pcf) | 25 | 37.5 | 50 | 62.5 | 75 | 87.5 | 100 |
| Sand (lbs) | 0 | 354 | 674 | 944 | 1264 | 1600 | 1854 |
| Cement (lbs) | 505 | 523 | 540 | 590 | 637 | 640 | 674 |
| Water (lbs) | 183.26 | 183.26 | 191.59 | 199.92 | 224.91 | 241.57 | 266.56 |
| Foam (gals) | 162 | 144 | 127 | 113 | 93 | 75 | 59 |
| Foaming Agent (lbs) | 2.60 | 2.40 | 2.10 | 1.80 | 1.50 | 1.20 | 1.00 |
| Water in Foam (lbs) | 108.29 | 95.80 | 83.30 | 74.97 | 62.48 | 49.98 | 37.49 |
| Total Water (lbs) | 291.55 | 279.6 | 274.89 | 274.89 | 287.39 | 291.55 | 304.05 |
| Water Cement Ratio | 0.58 | 0.53 | 0.51 | 0.47 | 0.45 | 0.46 | 0.45 |
| Percentage of Air | 80 | 72 | 63 | 57 | 50 | 42 | 35 |
| Wet Density (kg/m³) | 474 | 687 | 890 | 1075 | 1287 | 1510 | 1683 |

TABLE 4-continued

Mix Design Table (cuyd)

| | | | | | | | |
|---|---|---|---|---|---|---|---|
| Wet Density (pcf) | 29.5 | 42.8 | 54.8 | 67 | 8080 | 93.7 | 105 |

TABLE 5

Mix Design Table (cubic ft)

| | | | | | | | |
|---|---|---|---|---|---|---|---|
| Density (kg/m3) | 400 | 600 | 800 | 1000 | 1200 | 1400 | 1600 |
| Density (pcf) | 25 | 37.5 | 50 | 62.5 | 75 | 87.5 | 100 |
| Sand (lbs) | 0.00 | 13.11 | 24.96 | 34.96 | 46.81 | 59.26 | 68.67 |
| Cement (lbs) | 18.70 | 19.37 | 20.00 | 21.85 | 23.59 | 23.70 | 24.96 |
| Water (lbs) | 6.79 | 6.79 | 7.10 | 7.40 | 8.33 | 8.95 | 9.87 |
| Foam (gals) | 6.00 | 5.33 | 4.70 | 4.19 | 3.44 | 2.78 | 2.19 |
| Foaming Agent (lbs) | 0.10 | 0.9 | 0.8 | 0.7 | 0.6 | 0.04 | 0.04 |
| Water in Foam (lbs) | 4.01 | 3.55 | 3.9 | 2.78 | 2.31 | 1.85 | 1.39 |
| Total Water (lbs) | 10.80 | 10.34 | 10.18 | 10.18 | 10.64 | 10.80 | 11.26 |
| Water Cement Ratio | 0.58 | 0.53 | 0.51 | 0.47 | 0.45 | 0.46 | 0.45 |
| Percentage of Air | 80.00 | 72.00 | 63.00 | 57.00 | 50.00 | 42.00 | 35.00 |
| Wet Density (kg/m3) | 474 | 687 | 890 | 1075 | 1287 | 1510 | 1683 |
| Wet Density (pcf) | 29.5 | 42.8 | 54.8 | 67 | 80 | 93.7 | 105 |

The cured mixture is structural cellular lightweight concrete. The foam incorporates millions of microscopic, uniform, closed cell air bubbles. Most notably, method 1200 does not include mixing with coarse aggregates or light aggregates. The structural cellular lightweight concrete has a greater amount of entrapped air than conventional cellular lightweight concrete, wherein the coarse aggregate and light aggregates is substituted with air bubbles. The structural cellular lightweight concrete is suitable as load bearing members of buildings, roadway/highway pavement, pipeline insulation and pipeline support members, fire protection layers, above ground storage tanks, frost protected shallow foundations, foundations over permafrost ground, grouting and void fill for abandoned pipes, soil cavities beneath roadways/rail lines and voids beneath concrete slabs, cold weather construction material, precast cellular concrete panels, lightweight fill, energy-absorbing crash barriers, mine backfill and utility trench reinstatement. For example, method 1200 can produce a 32 ft. high, load-bearing concrete panel for commercial building construction. The structural cellular lightweight concrete also has high thermal mass properties that reduces heating and air/conditioning costs.

Hardware and Operating Environment

Figure 13:
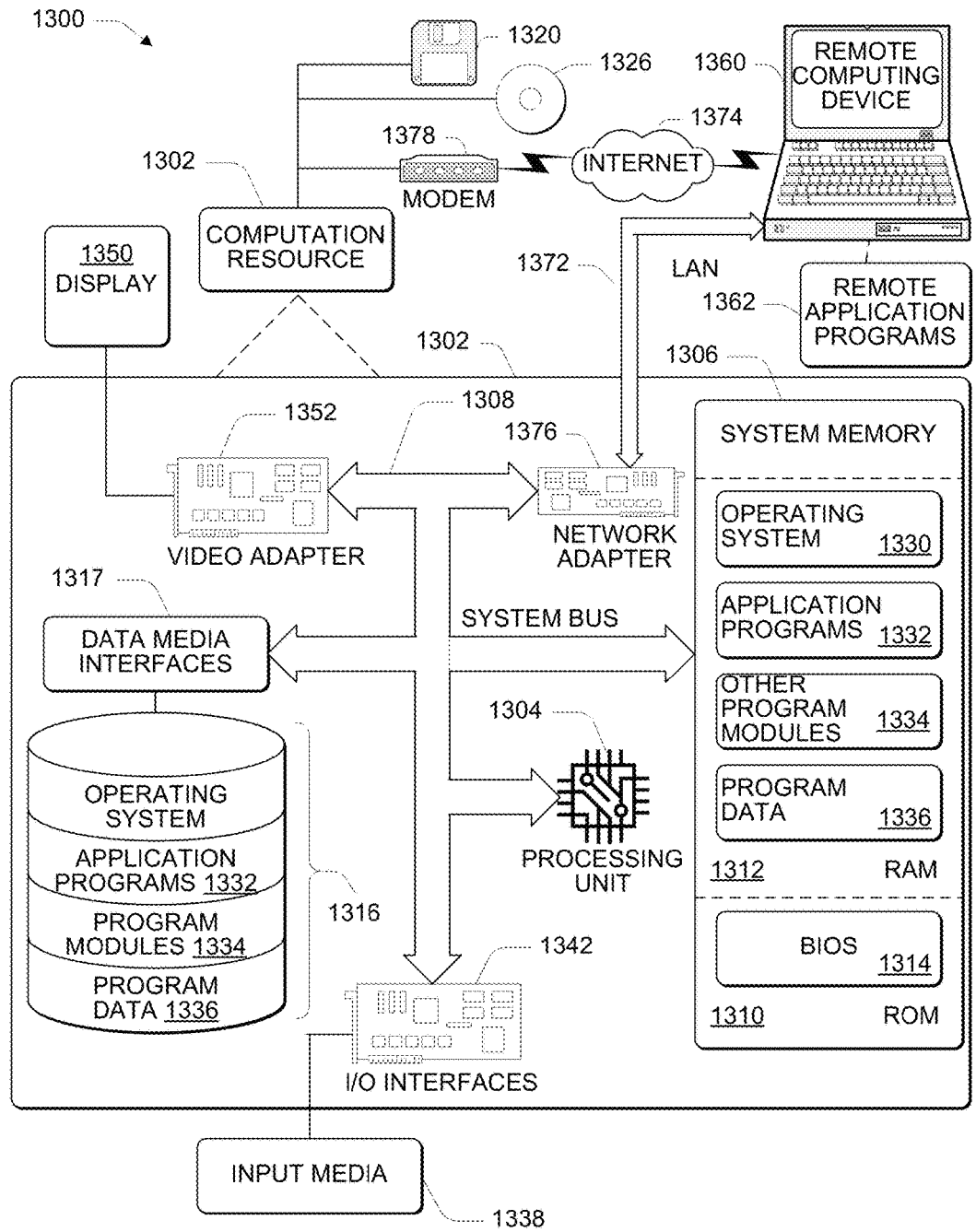
FIG. 13 is a block diagram of a hardware and operating environment in which different implementations can be practiced.

FIG. 13 is a block diagram of a hardware and operating environment 1300 in which different implementations can be practiced. The description of FIG. 13 provides an overview of computer hardware and a suitable computing environment in conjunction with which some implementations can be implemented. Implementations are described in terms of a computer executing computer-executable instructions. However, some implementations can be implemented entirely in computer hardware in which the computer-executable instructions are implemented in read-only memory. Some implementations can also be implemented in client/server computing environments where remote devices that perform tasks are linked through a communications network. Program modules can be located in both local and remote memory storage devices in a distributed computing environment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to manufacture of structural cellular lightweight concrete, the manufacture including: a concrete mixture that is no more than 65% by volume of the manufacture of structural cellular lightweight concrete, the concrete mixture conforming to the requirements of ASTM C33, the Standard Specification for Concrete Aggregates, that is published by ASTM Int'l. at 100 Barr Harbor Drive, PO Box C700, West Conshohocken, Pa., 19428-2959. ASTM C33 defines the requirements for grading and quality of fine and coarse aggregate for use in concrete. Fine aggregate shall consist of natural sand, manufactured sand, or a combination thereof. Fine aggregate shall be free of injurious amounts of organic impurities. Fine aggregate for use in concrete that will be subject to wetting, extended exposure to humid atmosphere, or contact with moist ground shall not contain any materials that are deleteriously reactive with the alkalis in the cement in amount sufficient to cause excessive expansion of mortar or concrete. Fine aggregate subjected to five cycles of the soundness test shall have a required weighted average loss. Coarse aggregate shall consist of gravel, crushed gravel, crushed stone, air-cooled blast furnace slag, or crushed hydraulic-cement concrete, or a combination thereof. The sampling and test methods shall be done with grading and fineness modulus test, organic impurities test, effect of organic impurities on strength test, soundness test, clay lumps and friable particles test, coal and lignite test, bulk density of slag test, abrasion of coarse aggregate test, reactive aggregate test, freezing and thawing test, and chert test method.

The manufacture of structural cellular lightweight concrete also includes foam that has a density of at least 5 lbs./ft$^3$, having high stability characteristics, and having a closed cell bubble structure. The manufacture of structural cellular lightweight concrete also includes mix water being potable and free of contamination or deleterious materials. The manufacture of structural cellular lightweight concrete also includes Portland cement conforming to ASTM C150, the Standard Specification for Portland Cement, that is also published by ASTM Int'l., the Portland cement being type i, type iii or white Portland cement. The manufacture of structural cellular lightweight concrete also includes at least 35% air by volume of the manufacture of structural cellular lightweight concrete. The manufacture of structural cellular lightweight concrete also includes that the volume of the air and the volume of the concrete sum to 100%. Other implementations of this aspect include corresponding computer systems, apparatus, and computer programs recorded on one or more computer storage devices, each configured to perform the actions of the methods. One example of the computer systems, apparatus, and computer programs recorded on one or more computer storage devices is shown in FIG. 13.

Implementations are described in terms of a computer executing computer-executable instructions. However, some implementations can be implemented entirely in computer hardware in which the computer-executable instructions are implemented in read-only memory. Some implementations can also be implemented in client/server computing environments where remote devices that perform tasks are linked through a communications network. Program modules can be located in both local and remote memory non-transitory storage devices in a distributed computing environment.

In some implementations, 100, 200, 1100 and 1200, when executed by a processor, such as processor 1304 in FIG. 13, causes the processor to perform the respective method. In other implementations, 100, 200, 1100 and 1200 are implemented as a computer-accessible medium having executable instructions capable of directing a processor, such as processor 1304 in FIG. 13, to perform the respective method. In varying implementations, the medium is a magnetic medium, an electronic medium, or an optical medium.

The computer 1300 includes a computation resource 1302 capable of implementing the processes described herein. It will be appreciated that other devices can be alternatively used that include more components, or fewer components, than those illustrated in FIG. 13.

The computer 1300 can function as one or more of the control segments, via implementation of the methods in FIGS. 1 and 11-12 as one or more computer program modules in FIG. 2-10.

The illustrated operating environment 1300 is only one example of a suitable operating environment, and the example described with reference to FIG. 13 is not intended to suggest any limitation as to the scope of use or functionality of the implementations of this disclosure. Other well-known computing systems, environments, and/or configurations can be suitable for implementation and/or application of the subject matter disclosed herein.

The computation resource 1302 includes one or more processors or processing units 1304, a system memory 1306, and a bus 1308 that couples various system components including the system memory 1306 to processor(s) 1304 and other elements in the environment 1300. The bus 1308 represents one or more of any of several types of bus structures, including a memory bus or memory controller, a peripheral bus, an accelerated graphics port and a processor or local bus using any of a variety of bus architectures, and can be compatible with SCSI (small computer system interconnect), or other conventional bus architectures and protocols.

In some implementations, the processor unit 1304 includes the various apparatus and systems described in this application that provide control of the apparatus 200, apparatus 300, apparatus 400, apparatus 500, trailer 600, trailer 700 and that perform methods 100, 1100 and 1200. Examples of the various apparatus and systems that are included in the processor unit 1304 include the keyboard data receiver 802, voice data receiver 804 and/or a synaptic data receiver 806 in FIG. 8, and/or voice-recognition unit 1304 in FIG. 13 and other tangible systems that perform methods 100, 1100 and 1200.

The system memory 1306 includes nonvolatile read-only memory (ROM) 1310 and random access memory (RAM) 1312, which can or can not include volatile memory elements. A basic input/output system (BIOS) 1314, containing the elementary routines that help to transfer information between elements within computation resource 1302 and with external items, typically invoked into operating memory during start-up, is stored in ROM 1310.

The computation resource 1302 further can include a non-volatile read/write memory 1316, represented in FIG. 13 as a hard disk drive, coupled to bus 1308 via a data media interface 1317 (e.g., a SCSI, ATA, or other type of interface); a magnetic disk drive (not shown) for reading from, and/or writing to, a removable magnetic disk 1320 and an optical disk drive (not shown) for reading from, and/or writing to, a removable optical disk 1326 such as a CD, DVD, or other optical media.

The non-volatile read/write memory 1316 and associated computer-readable media provide nonvolatile storage of computer-readable instructions, data structures, program modules and other data for the computation resource 1302. Although the exemplary environment 1300 is described herein as employing a non-volatile read/write memory 1316, a removable magnetic disk 1320 and a removable optical disk 1326, it will be appreciated by those skilled in the art that other types of computer-readable media which can store data that is accessible by a computer, such as magnetic cassettes, FLASH memory cards, random access memories (RAMs), read only memories (ROM), and the like, can also be used in the exemplary operating environment.

A number of program modules can be stored via the non-volatile read/write memory 1316, magnetic disk 1320, optical disk 1326, ROM 1310, or RAM 1312, including an operating system 1330, one or more application programs 1332, other program modules 1334 and program data 1336. Examples of computer operating systems conventionally employed include the NUCLEUS® operating system, the LINUX® operating system, and others, for example, providing capability for supporting application programs 1332 using, for example, code modules written in the C++® computer programming language.

A user can enter commands and information into computation resource 1302 through input devices such as input media 1338 (e.g., keyboard/keypad, tactile input or pointing device, mouse, foot-operated switching apparatus, joystick, touchscreen or touchpad, microphone, antenna etc.). Such input devices 1338 are coupled to the processing unit 1304 through a conventional input/output interface 1342 that is, in turn, coupled to the system bus. A monitor 1350 or other type of display device is also coupled to the system bus 1308 via an interface, such as a video adapter 1352.

The computation resource 1302 can include capability for operating in a networked environment using logical connections to one or more remote computers, such as a remote computer 1360. The remote computer 1360 can be a personal computer, a server, a router, a network PC, a peer device or other common network node, and typically includes many or all of the elements described above relative to the computation resource 1302. In a networked environment, program modules depicted relative to the computation resource 1302, or portions thereof, can be stored in a remote memory non-transitory storage device such as can be associated with the remote computer 1360. By way of example, remote application programs 1362 reside on a memory device of the remote computer 1360. The logical connections represented in FIG. 13 can include interface capabilities, e.g., such as interface capabilities in FIG. 8, a storage area network (SAN, not illustrated in FIG. 13), local area network (LAN) 1372 and/or a wide area network (WAN) 1374, but can also include other networks.

Such networking environments are commonplace in modern computer systems, and in association with intranets and the Internet. In certain implementations, the computation resource 1302 executes an Internet Web browser program (which can optionally be integrated into the operating system 1330), such as the "Internet Explorer®" Web browser manufactured and distributed by the Microsoft Corporation of Redmond, Wash.

When used in a LAN-coupled environment, the computation resource 1302 communicates with or through the local area network 1372 via a network interface or adapter 1376. When used in a WAN-coupled environment, the computation resource 1302 typically includes interfaces, such as a modem 1378, or other apparatus, for establishing communications with or through the WAN 1374, such as the Internet. The modem 1378, which can be internal or external, is coupled to the system bus 1308 via a serial port interface.

In a networked environment, program modules depicted relative to the computation resource 1302, or portions thereof, can be stored in remote memory apparatus. It will be appreciated that the network connections shown are exemplary, and other means of establishing a communications link between various computer systems and elements can be used.

A user of a computer can operate in a networked environment using logical connections to one or more remote computers, such as a remote computer 1360, which can be a personal computer, a server, a router, a network PC, a peer device or other common network node. Typically, a remote computer 1360 includes many or all of the elements described above relative to the computer 1300 of FIG. 13.

The computation resource 1302 typically includes at least some form of computer-readable media. Computer-readable media can be any available media that can be accessed by the computation resource 1302. By way of example, and not limitation, computer-readable media can comprise computer storage media and communication media.

CONCLUSION

A structural cellular lightweight concrete is described. A technical effect of the structural cellular lightweight concrete is to create loading bearing structural members of buildings and other structures. Although specific implementations are illustrated and described herein, it will be appreciated by those of ordinary skill in the art that any arrangement which is calculated to achieve the same purpose may be substituted for the specific implementations shown. This application is intended to cover any adaptations or variations. For example, although described in construction terms, one of ordinary skill in the art will appreciate that implementations can be made in any other application that provides the required function.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future building devices, foaming agents, and new cement. The terminology used in this application meant to include all load bearing structures and environments and alternate technologies which provide the same functionality as described herein.

The invention claimed is:

1. A manufacture of structural cellular lightweight concrete, the manufacture comprising:
   concrete conforming to requirements of ASTM C33, the concrete including Portland cement conforming to ASTM C150, the Portland cement being Type I, Type II, Type III or White Portland cement;
   foam that has a density of at least 5 lbs/ft$^3$, and that has a closed cell bubble structure, the foam including water, liquid foam agent and air;
   mix water being potable and free of contamination or deleterious materials; and
   wherein 1.5 lbs per cubic yard of the manufacture is liquid foam agent and 62.5 lbs per cubic yard of the manufacture is water.

2. The manufacture of claim 1, wherein the manufacture comprises:
   no coarse aggregate.

3. The manufacture of claim 1, wherein the manufacture comprises:
   no lightweight aggregate.

4. A manufacture of structural cellular lightweight concrete, the manufacture comprising:
   a concrete mixture that is no more than 65% by volume of the manufacture of structural cellular lightweight concrete, the concrete mixture comprising:
      concrete conforming to requirements of ASTM C33, the concrete including Portland cement conforming to ASTM C150, the Portland cement being Type I, Type II, Type III or White Portland cement;
      foam having air and the foam having a density of at least 5 lbs/ft$^3$ and that has a closed cell bubble structure; and
      mix water being potable and free of contamination or deleterious materials; and
   wherein the manufacture of structural cellular lightweight concrete has at least 35% air by volume,
   wherein the volume of the air and the volume of the concrete mixture sum to 100%.

5. The manufacture of claim 4, wherein the manufacture comprises no coarse aggregate.

6. The manufacture of claim 4, wherein the manufacture comprises no lightweight aggregate.

7. The manufacture of claim 4, wherein the manufacture comprises no fine aggregate.

8. The manufacture of claim 4, wherein the manufacture has a density of no more than 75 lbs./cubic foot.

9. The manufacture of claim 4, wherein the foam further comprises:
   a foaming agent that includes only organic materials.

* * * * *